United States Patent [19]

Sprenkle, Jr.

[11] Patent Number: 5,037,869
[45] Date of Patent: Aug. 6, 1991

[54] PROCESS FOR PREPARING FLAME RETARDANT POLYAMIDE MOLDING RESINS CONTAINING MELAMINE CYANURATE

[75] Inventor: William E. Sprenkle, Jr., Palmer, Mass.

[73] Assignee: Monsanto Company, St. Louis, Mo.

[21] Appl. No.: 534,873

[22] Filed: Jun. 8, 1990

[51] Int. Cl.$^5$ .................. C08K 5/3492; C08K 5/11; C08K 5/05
[52] U.S. Cl. .................................. 524/100; 524/101; 524/287; 524/314; 524/606
[58] Field of Search .............. 524/100, 101, 287, 314, 524/606

[56] References Cited

U.S. PATENT DOCUMENTS

| | | | |
|---|---|---|---|
| 2,456,344 | 12/1948 | Vaala | 524/287 |
| 4,085,080 | 4/1978 | Elbert | 524/287 |
| 4,298,518 | 11/1981 | Ohmura et al. | 524/101 |
| 4,321,189 | 3/1982 | Ohshita et al. | 524/100 |
| 4,363,890 | 12/1982 | Ohshita et al. | 524/100 |
| 4,452,931 | 6/1984 | Okamoto et al. | 524/287 |

Primary Examiner—Kriellion S. Morgan

[57] ABSTRACT

An improved process is disclosed for preparing flame retardant polyamide molding resins containing melamine cyanurate as a flame retarding agent which results in products with improved mechanical properties and good flame retarding properties. It comprises the addition of a glycol and a phthalate ester to the process wherein a polyamide, melamine or derivatives thereof and cyanuric acid are melt-blended in the presence of water.

19 Claims, No Drawings

PROCESS FOR PREPARING FLAME RETARDANT POLYAMIDE MOLDING RESINS CONTAINING MELAMINE CYANURATE

BACKGROUND OF THE INVENTION

The present invention relates to an improvement in the process for preparing flame retardant polyamide molding resins that contain melamine cyanurate as a flame retarding agent which results in products with improved mechanical properties and good flame retarding properties. More particularly, it relates to an improvement which comprises the addition of a glycol and a phthalate ester to the process wherein a polyamide, melamine or derivatives thereof and cyanuric acid are melt-blended in the presence of water.

Polyamide molding resins are used in a wide range of applications because of their excellent mechanical strength. For electrical and other applications, a high level of flame retardancy is required along with excellent mechanical strength. For tie-strap and other related applications an even higher degree of mechanical strength, in particular, a higher degree of tensile elongation, is required.

Melamine and other triazines, and certain salts of said compounds such as melamine cyanurate, are known to function as flame retardants when melt-blended in polyamides at from about 5% by weight to about 20% by weight. It is believed that the manner by which the flame retardancy is brought about is through the thermal decoxposition of the additive (gas phase) which blankets the burn site so as to exclude oxygen.

Melamine cyanurate salt can be added directly to a molten polyamide resin or it can be formed during melt-blending of polyamide resins With melamine or derivatives thereof and cyanuric acid in the presence of water. See U.S. Pat. No. 4,363,890.

The advantages of utilizing the latter process are the lower cost of melamine and cyanuric acid as compared to melamine cyanurate salt and the ability to form melamine cyanurate salt in situ having a smaller particle size than the commercially available product thereby increasing its dispersion in the polyamide and advantageously affecting the mechanical and flame retarding properties of the resulting resin.

The disadvantages are that when processing polyamides with higher melt temperatures it becomes very difficult to assure consistent melamine cyanurate salt formation. This result can be attributed to the water being volatilized during extrusion before the salt has a chance to form which necessitates the use of an excess of water or a closed melt-blending system. The excess water is undesirable and the closed system gives rise to other problems.

In addition, the mechanical strength of the resins produced by the latter process is inadequate for certain applications.

SUMMARY OF THE INVENTION

The present invention therefore provides an improved process for preparing flame retardant polyamide molding resins containing melamine cyanurate. The improved process comprises the addition of a glycol and a phthalate ester to the process wherein a polyamide is melt-blended with melamine or derivatives thereof and cyanuric acid in the presence of water. Polyamide molding resins prepared by the improved process exhibit improved mechanical properties and good flame retarding properties.

The present invention also provides an improved flame retardant polyamide molding resin comprising a polyamide, melamine cyanurate, formed in situ, in the presence of water, a glycol and a phthalate ester such as dioctyl or diundecyl phthalate.

PREFERRED EMBODIMENTS

The glycol component used in the present invention can be any glycol which is compatible with water and which does not contribute significantly to the fuel value of the resulting resin. The term "compatible" as used herein means the capability of forming a chemically stable system. The phrase "contribute significantly" means to at least cause a borderline flammability situation where one or two samples in a group of ten identical samples, when tested according to Underwriters Laboratory Test No. UL-94, will drop flaming particles or droplets while burning.

Suitable glycols include ethylene glycol, propylene glycol, polyethylene glycol and octanediol. It has been found that when the glycol is present in an amount from about 0.10% to about 0.50% by weight and preferably in an amount from about 0.10% to about 0.20% by weight it will favorably affect the properties of the resulting resin. The mechanism involved is uncertain. The higher boiling glycol may be promoting the salt formation itself, or the glycol may be tying up some water as an azeotrope in the polyamide. It is possible that the glycol addition is affecting the melamine cyanurate particle size as well thereby attributing to the increase in the mechanical properties of the resulting resin.

With regard to the phthalate ester wetting agent employed in the present invention, it has been found that a phthalate ester, especially diundecyl phthalate (DUP) and dioctyl phthalate (DOP), when employed with melamine or derivatives thereof, cyanuric acid and a polyamide in the presence of water will provide a product with improved mechanical properties. When the phthalate ester is employed with a glycol in the above process, a product with good flame retarding and excellent mechanical properties results. While the weight % of said phthalates used in the inventive process is 0.5 to 3.0%, from about 0.5% by weight to about 2.0% by weight is preferred for DUP, while a range of from about 1.0% by weight to about 2.5% by weight is preferred for DOP.

The melamine used in the present invention is well known in the art and readily available. If so desired, the melamine powder may be purified by recrystallization from water or may be further finely pulverized. Preferably melamine powder having an average diameter of less than 50 microns is used. Melamine derivatives such as acetoguanamine, ethylmelamine, benzo-guanamine and the like may also be used. The melamine component is present in amounts of from about 3.0% to about 7.5% by weight, preferably from about 4.0% to about 6.0% by weight.

The cyanuric acid used in the present invention preferably has a particle size small enough for 85% by weight to pass through a 100 mesh screen, 99% by weight to pass through a 20 mesh screen. The term "cyanuric acid" as used herein means both cyanuric and isocyanuric acid inclusively. The cyanuric acid component is present in amounts of from about 3.0% to about 7.5% by weight, preferably from about 4.0% to about 6.0% by weight.

The amount of melamine and cyanuric acid added to the polyamide should be substantially equimolar or proportioned such that melamine is the dominant component. Residual unreacted melamine is normally volatilized off at the end of the process along with the water.

An effective amount of water is added in the inventive process to assure the salt formation. Preferably the water is present in an amount of at least 0.5% by weight. The amount of water should be kept to a minimum, i.e. less than 2% by weight, in order not to adversely affect the desirable properties of the polyamide.

The polyamide resins used in the present invention may be any thermoplastic polyamide resin. For example, the polyamide resins obtained by polymerizing lactams or aminocarboxylic acids having three or more carbon atoms, or by polycondensation of diamines and dicarboxylic acids or derivatives thereof. The polyamide resins include homopolymers and copolymers of polyamides and mixtures thereof. Examples of the polyamide resins are homopolyamides such as nylon 6, nylon 66, nylon 4, nylon 8, nylon 11, nylon 2, nylon 69, nylon 610 and nylon 612 and copolyamides such as nylon 6/66, nylon 6/12 and nylon 6/69. Said polyamide resins are present in amounts of from 79.5% by weight to about 92.9% by weight based on the total weight of polyamide, melamine or derivatives thereof, cyanuric acid, glycol, phthalate ester and water.

The polyamide molding resins of the present invention may also contain other additives such as dyes, pigments, fillers, fibrous reinforcing fillers, heat-resisting agents, weather-proofing agents, plasticizers, lubricants, mold-release agents, nucleating agents and antistatic agents that do not adversely affect the flammability or mechanical properties of the resulting resin. Particularly, in order to increase the heat resistance of the resulting resin, copper-containing compounds which are effective for heat-stabilizing ordinary polyamide resins, for example, inorganic salts such as copper iodide and copper sulfate and organic acid salts such as copper acetate and copper stearate may be used. The copper compounds mentioned above may be used together with an alkali metal or an alkaline earth metal. Hindered phenols and phosphite compounds may also be used as heat stabilizing agents.

The preferred blending technique used to attain optimum improvement in the mechanical and flame retarding properties of the polyamide molding resin is as follows:

The polyamide in the form of pellets is blended with a mixture of water and glycol. A phthalate ester is then introduced along with any additive(s), if desired, and the mixture further blended. Preblended melamine and cyanuric acid powder is then charged to the mixture and the mixture blended until a uniform mix is obtained.

The uniform mixture is then introduced into an extruder and melt-blended. In this case melt-blending means blending at a temperature high enough to maintain the polyamide in a molten state. No specific melt-blending conditions are required.

The flame retardant polyamide molding resin of the present invention contains from about 79.5% to about 92.9% by weight of a polyamide, from about 6.0% to about 15.0% by weight of melamine cyanurate, formed in situ, in the presence of water, from about 0.5% to about 3.0% by weight of dioctyl or diundecyl phthalate and a minor amount of a glycol. Molded samples prepared from this inventive resin exhibit improved mechanical and flame retarding properties.

The present invention is described in more detail with reference to the following Examples which are for purposes of illustration only and are not to be understood as indicating or implying any limitations on the broad invention described herein.

The weight percents used herein are based on the total weight of polyamide, melamine or derivatives thereof, cyanuric acid, glycol, phthalate ester and water.

SPECIFIC EMBODIMENTS

Sample Preparation

A. Preblending

The polyamide pellets were kept dry in a sealed container prior to processing. The pellets were initially blended with a mixture of water and a glycol utilizing a drum tumbler for one hour. Diundecyl phthalate (DUP) or dioctyl phthalate (DOP) and cuprous iodide (CuI) were then added to the polyamide mixture and the mixture blended for an additional one-half hour. Preblended melamine powder (Mel) supplied by Aero Melamine and cyanuric acid powder (CyA) with a particle size small enough for 85% by weight to pass through a 100 mesh screen, 99% through a 20 mesh screen was then charged to the polyamide mixture and the mixture blended for three to five minutes until a uniform mix was obtained.

B. Processing

1. Extrusion Compounding Conditions

The preblended mixture was then melt blended in a Leistritz twin screw extruder at a rate of about 11 kilograms per hour and a screw speed of about 250 RPM. A full vacuum (76.2 cm. Hg) was applied only to the last ⅓ of the Leistritz screw configuration.

The stock temperature varied with the particular polyamide introduced as follows:

| POLYAMIDE | STOCK TEMPERATURE (°C.) |
| --- | --- |
| Nylon 66 | 255 |
| Nylon 66/6 (94/6) | 250 |
| Nylon 66/6 (85/15) | 250 |
| Nylon 6 | 235–240 |

The zone temperatures of the extruder were set as specified below:

| | FEED | | | | DIE | | | | | |
| --- | --- | --- | --- | --- | --- | --- | --- | --- | --- | --- |
| Set Temp., Zone | 1 | 2 | 3 | 4 | 5 | 6 | 7 | 8 | 9 | 10 |
| °C. | 230 | 240 | 250 | 250 | 250 | 255 | 255 | 255 | 255 | 255 |

The processed molten mixture was extruded to form a single strand and then cut into 0.32 cm. pellets.

2. Injection Molding

The sample pellets were dried overnight t 60° C. prior to molding. The pellets were molded into 12.7 cm.×1.27 cm.×(0.16 cm. or 0.32 cm) UL flame test specimens, 16.5 cm.×1.27 cm.×0.32 cm. tensile test specimens and 12.7 cm.×1.27 cm.×(0.32 or 0.64 cm.) impact test specimens using an 85 g. Arburg injection molding machine utilizing the following molding conditions:

| Set Temperature, °C., | Zone 1 | 260 |
|---|---|---|
| | 2 | 271 |
| | 3 | 277 |
| Nozzle Temperature, °C. | | 279 |
| Stock Temperature, °C. | | 282* |
| Mold Temperature, °C. | | 93 |
| Injection Time, sec. | | 1.0 |
| Injection Pressure | | Max. |
| Hold Pressure, MPa | | 6.89 |
| Cycle Time Hold/Cool/Dwell, sec. | | 15/15/2 |

*for nylon 66 based nylons: temperature will vary depending on polyamide being processed.

Test Methods

The molded specimens were tested for notched Izod impact strength per ASTM D256-87 (5 specimens, each at 0.32 cm. and 0.64 cm. thickness), tensile strength at yield and at fail and tensile elongation at fail per ASTM D638-876 (type I specimen, 0.51 cm./min. speed, 5 specimens), and flammability per Underwriters Laboratory Test No. UL-94 (vertical burn).

The specimens tested for flammability were supported from the upper end with the longest dimension vertical, by a clamp on a ring stand so that the lower end of the specimen was three-eighth inch above the top of a burner tube. The burner was then placed remote from the sample, ignited and adjusted to produce a blue flame three-fourth inch in height.

The test flame was placed centrally under the lower end of the test specimen and allowed to remain for 10 seconds. The test flame was then withdrawn, and the duration of flaming or glowing combustion of the specimen noted. If flaming or glowing combustion of the specimen ceased within 30 seconds after removal of the test flame, the test flame was again placed under the specimen for 10 seconds. The test flame was again withdrawn, and the duration of flaming or glowing combustion of the specimen noted.

If the specimen dropped flaming particles or droplets while burning in this test, these drippings were allowed to fall onto a horizontal layer of cotton fibers (untreated surgical cotton) placed one foot below the test specimen. Significantly flaming particles were considered to be those capable of igniting the cotton fibers.

The duration of flaming or glowing combustion of vertical specimens after application of the test flame, average of five specimens (10 flame applications) can not exceed 25 seconds (maximum not more than 30 seconds), and the portion of the specimen outside the clamp can not be completely burned in the test.

Materials which complied with the above requirements and did not drip any flaming particles or droplets during the burning test were classified as V-1 according to the nomenclature used in the UL-94 test.

Materials which complied with the above requirements, but dripped flaming particles or droplets which ignited cotton fibers were classified as V-2 according to the nomenclature used in the UL94 test.

Class V-0 was given to materials wherein the duration of flaming averaged less than 5 seconds under the conditions above with no ignition burning more than 10 seconds and no dripping of flaming particles.

The combined UL-94 Rating V-2/V-0 was used to identify a borderline situation where one or two of the ten samples tested dropped flaming particles or droplets while burning.

EXAMPLE 1 to 7

In Examples 1 through 7 molded test specimens were made from commercial flame retardant nylon resins and from resins prepared by the inventive process and were tested for mechanical and flame retarding properties.

In Examples 1 and 2 commercial flame retardant nylon resins manufactured by Emser, under the tradename Grilon, with product numbers T302VO and A28VO respectively, were tested for comparison purposes. These samples contained melamine cyanurate with polyamide base resins of nylon 66 (N66) and nylon 6 (N6) respectively, as determined by FTIR analysis.

In Example 3, a commercial flame retardant nylon resin manufactured by Toray Industries, Inc., with a product number CM3004V0 (See, U.S. Pat. No. 4363890) was also tested for comparison purposes. This sample contained melamine cyanurate with a polyamide base resin of nylon 66 (N66), as determined by FTIR analysis.

Examples 4 through 7 were prepared utilizing the inventive process. The results are tabulated in Table I.

TABLE I

SUMMARY OF EXAMPLES 1 TO 7

| | % BY WEIGHT | | | | | | |
|---|---|---|---|---|---|---|---|
| | #1 | #2 | #3 | #4 | #5 | #6 | #7 |
| Polyamide-type | N66 | N6 | N66 | N66 | N66/6-1* | N66/6-2** | N6 |
| Polyamide | ~91.5–92 | ~91.5–92 | <91.5 | 89 | 89 | 89 | 88.5 |
| DUP | 0 | 0 | 0 | 1.5 | 1.5 | 1.5 | 0 |
| DOP | 0 | 0 | 0 | 0 | 0 | 0 | 2.0 |
| H$_2$O | 0 | 0 | >1.0 | 1.0 | 1.0 | 1.0 | 1.0 |
| EG | 0 | 0 | 0 | 0.15 | 0.15 | 0.15 | 0.15 |
| Mel | 0 | 0 | 4.3–4.5 | 4.8 | 4.8 | 4.8 | 4.8 |
| CyA | 0 | 0 | 4.3–4.5 | 4.7 | 4.7 | 4.7 | 4.7 |
| MelCy | 8–8.5 | 8–8.5 | 0 | 0 | 0 | 0 | 0 |
| CuI | 0 | 0 | ≦0.10 | 0.03 | 0.03 | 0.03 | 0.03 |
| Izod .32 cm. (J/m) | 37.9 | 39.0 | 40.0 | 53.4 | 58.7 | 64.1 | 58.7 |
| Izod .64 cm. (J/m) | 36.8 | 36.3 | 41.6 | NT | NT | NT | NT |
| Tens. St. Y (MPa) | 82.8 | 75.0 | 83.0 | 78.6 | 72.4 | 72.4 | 69.6 |
| Tens. St. F (MPa) | 79.9 | 57.1 | 80.9 | 69.8 | 60.7 | 57.3 | 55.9 |
| Tens. Elong. F (%) | 12.5 | 26 | 14 | 40 | 50–60 | 55–65 | 180–230 |

TABLE I-continued

| | SUMMARY OF EXAMPLES 1 TO 7 | | | | | | |
|---|---|---|---|---|---|---|---|
| | % BY WEIGHT | | | | | | |
| | #1 | #2 | #3 | #4 | #5 | #6 | #7 |
| Polyamide-type | N66 | N6 | N66 | N66 | N66/6-1* | N66/6-2** | N6 |
| UL-94 Rating .16 cm. | V-0 | V-0 | V-0 | V-0 | V-0 | V-0 | V-0 |

*N66/6-1 = a copolyamide of nylon 66 (94 weight %) and nylon 6 (6 weight %).
**N66/6-2 = a copolyamide of nylon 66 (87-89 weight %) and nylon 6 (11-13 weight %).
NT = Not Tested.

It is apparent from the results listed in Table I that all of the samples have a V-O rating. However, the flame retardant polyamide molding resins of the present invention (Example 4 through 7) exhibit improved ductility as demonstrated by the % tensile elongation at fail, increased Izod impact strength and similar tensile strength as compared to the flame retardant polyamide molding resins of Example 1 to 3.

In Example 1, the molded resin utilizing nylon 66 as the polyamide is not very ductile.

Example 2, which utilizes nylon 6 as the polyamide demonstrates slightly improved ductility over Example 1 (26% elongation v. 12.5%).

In example 3, the resulting molded nylon 66 resin, as in Example 1, demonstrates poor ductility (14% elongation).

Example 4 through 7 demonstrate that improved ductility and improved Izod impact strength result from the addition of ethylene glycol and a phthalate ester to the process wherein melamine cyanurate is formed in situ in the presence of water during melt-processing of the polyamide. In addition Examples 4 through 7 demonstrate that as the percentage of nylon 6 in the polyamide increases the ductility also increases with a nylon 6 homopolyamide exhibiting exceptional ductility.

EXAMPLES 8 to 12

In Examples 8 through 12 the effects of the addition of either diundecyl phthalate (DUP) or dioctyl phthalate (DOP) on the mechanical and flame retarding properties of a nylon 66 molding resin containing melamine cyanurate were determined.

The samples were prepared by melt-blending the phthalate ester wetting agent and fine particle size melamine cyanurate salt with nylon 66. The results are tabulated in Table II.

TABLE II

| | SUMMARY OF EXAMPLES 8 TO 12 | | | | |
|---|---|---|---|---|---|
| | % BY WEIGHT | | | | |
| | #8 | #9 | #10 | #11 | #12 |
| N66 | 92 | 89 | 89 | 89 | 88 |
| DUP | 0 | 1.5 | 2.0 | 0 | 0 |
| DOP | 0 | 0 | 0 | 1.5 | 2.5 |
| MelCy | 8.0 | 9.5 | 9.0 | 9.5 | 9.5 |
| Izod 0.32 cm. (J/m) | 29.4 | 48.6 | 46.5 | 45.4 | 51.8 |
| Tens. Elong. F. (%) | 10 | 39 | 28 | 30 | 34 |
| UL-94 Rating 0.16 cm. | V-0 | V-0 | V-2 | V-0 | V-2/V-0 |

Examples 8 through 12 demonstrate the utility of phthalate ester wetting agents as dispersion aids in non-halogenated flame retardant polyamide molding resins.

Example 8 is a control containing no wetting agent. In the absence of a wetting agent the melamine cyanurate/polyamide composite is very brittle.

Examples 9 and 10 employ diundecyl phthalate as the wetting agent resulting in ductile products with improved Izod impact test results. Example 10 demonstrates the limit at which diundecyl phthalate addition becomes detrimental to flammability. It appears from the data obtained that 1.5% of diundecyl phthalate wetting agent is optimum.

Examples 11 and 12 employ dioctyl phthalate as the wetting agent also resulting in ductile products with improved Izod impact test results. Example 12 demonstrates the limit at which dioctyl phthalate addition becomes detrimental to flammability. It appears from the data obtained that 1.5% of dioctyl phthalate is optimum.

EXAMPLES 13 TO 26

Examples 13 through 26 are presented to further illustrate the present invention and demonstrate the effects of using a phthalate ester and ethylene glycol in the process for forming melamine cyanurate in situ in the presence of water in molten polyamide resins. Examples 13 through 26 were prepared utilizing the inventive process. The results are tabulated in Table III.

TABLE III

| | % BY WEIGHT | | | | | | |
|---|---|---|---|---|---|---|---|
| | SUMMARY OF EXAMPLES 13 TO 19 | | | | | | |
| | #13 | #14 | #15 | #16 | #17 | #18 | #19 |
| Polyamide-type | N66 | N66/6-1 | N66/6-2 | N6 | N66 | N66 | N66/6-1 |
| Polyamide | 89 | 89 | 89 | 88.5 | 89 | 89 | 89 |
| DUP | 1.5 | 1.5 | 1.5 | 0 | 1.5 | 1.5 | 1.5 |
| DOP | 0 | 0 | 0 | 2.0 | 0 | 0 | 0 |
| H$_2$O | 1.5 | 1.5 | 1.5 | 1.5 | 1.0 | 1.0 | 1.0 |
| EG | 0 | 0 | 0 | 0 | 0.15 | 0.25 | 0.15 |
| Mel | 4.8 | 4.8 | 4.8 | 4.8 | 4.8 | 4.8 | 4.8 |
| CyA | 4.7 | 4.7 | 4.7 | 4.7 | 4.7 | 4.7 | 4.7 |
| CuI | 0.03 | 0.03 | 0.03 | 0.03 | 0.03 | 0.03 | 0.03 |
| Izod 0.32 cm. (J/m) | 37.4 | 53.4 | 42.7 | 53.4 | 53.4 | 50.7 | 58.7 |
| Izod 0.64 cm. (J/m) | 37.4 | NT | NT | 52.3 | 48.1 | 48.1 | NT |
| Tens. St. Y (MPa) | 80.7 | 75.8 | 72.4 | 71.0 | 78.6 | 77.6 | 72.4 |
| Tens. St. F (MPa) | 78.6 | 64.9 | 55.2 | 54.5 | 66.6 | 70.3 | NT |
| Tens. Elong. F (%) | 15 | 40-45 | 45-65 | 55-70 | 40 | 45 | 50 |

TABLE III-continued

| | % BY WEIGHT | | | | | | |
|---|---|---|---|---|---|---|---|
| UL-94 Rating 0.16 cm. | V-2 | V-0 | V-0 | V-0 | V-0 | V-2/V-0 | V-0 |

SUMMARY OF EXAMPLES 20 TO 26

| Polyamide-type | #20 N66/6-1 | #21 N66/6-1 | #22 N66/6-1 | #23 N66/6-1 | #24 N66/6-1 | #25 N66/6-2 | #26 N6 |
|---|---|---|---|---|---|---|---|
| Polyamide | 89 | 89.5 | 89 | 89 | 89 | 89 | 88.5 |
| DUP | 1.5 | 1.0 | 0 | 0 | 0.75 | 1.5 | 0 |
| DOP | 0 | 0 | 1.5 | 1.5 | 0.75 | 0 | 2.0 |
| $H_2O$ | 0.5 | 1.5 | 1.0 | 1.0 | 1.0 | 1.0 | 1.0 |
| EG | 0.20 | 0.25 | 0.10 | 0.25 | 0.10 | 0.15 | 0.15 |
| Mel | 4.8 | 4.8 | 4.8 | 4.8 | 4.8 | 4.8 | 4.8 |
| CyA | 4.7 | 4.7 | 4.7 | 4.7 | 4.7 | 4.7 | 4.7 |
| CuI | 0 | 0 | 0 | 0 | 0 | 0.03 | 0.03 |
| Izod 0.32 cm. (J/m) | 49.7 | 69.4 | 53.9 | 54.5 | 52.3 | 64.1 | 58.7 |
| Izod 0.64 cm. (J/m) | 51.3 | 58.7 | 53.9 | 55.0 | 50.2 | 58.7 | NT |
| Tens. St. Y (MPa) | 70.9 | 74.7 | 72.9 | 73.3 | 71.1 | 72.4 | 69.6 |
| Tens. St. F (MPa) | 62.2 | 58.6 | 58.6 | 59.1 | 60.4 | 58.7 | 55.9 |
| Tens. Elong. F (%) | 49 | 34 | 41 | 35 | 45 | 55–65 | 180–230 |
| UL-94 Rating 0.16 cm. | V-0 | V-0 | V-0 | V-2 | V-2 | V-0 | V-0 |

N66/6-1 = a copolyamide of nylon 66 (94 weight %) and nylon 6 (6 weight %).
N66/6-2 = a copolyamide of nylon 66 (87–89 weight %) and nylon 6 (11–13 weight %).
NT = Not Tested.

Examples 13 through 16 show the properties that result in different polyamides when melamine cyanurate is formed in situ in the presence of a phthalate ester and water but without the presence of ethylene glycol.

In Example 13, the resulting polyamide molding resin demonstrates poor flame retarding properties and is brittle. The polyamide, nylon 66, has a higher melt temperature than the other nylons tested. Therefore, the water needed for the melamine cyanurate salt formation may be driven off in the form of steam before the salt formation adversely affecting the mechanical and flame retarding properties of the resulting product.

In Examples 14 through 16, the polyamides used have lower melt temperatures making it easier to assure the presence of water during salt formation. In addition, the mechanical properties of these polyamide molding resins are good.

Examples 17, 19, 25 and 26, utilizing various polyamides, demonstrate that the addition of small amounts of ethylene glycol (0.15%) along with the phthalate ester and the water produces a product with consistently good flame retarding properties. In addition, the products show consistently improved mechanical properties.

In Examples 17 and 18, the amount of ethylene glycol added is increased from 0.15% in Example 17 to 0.25% in Example 18. Example 18 demonstrates the limit (0.25%), when the phthalate ester is present at 1.5%, at which ethylene glycol addition becomes detrimental to flammability.

Example 20 demonstrates that the addition of ethylene glycol enables a reduction in the amount of melamine cyanurate salt in the melt phase of the polyamide resin to 0.5% water.

In Example 21, the addition of ethylene glycol enables a reduction in the amount of phthalate ester wetting agent. It appears from the data obtained that 0.5% less phthalate is required when ethylene glycol is present.

In Examples 20 and 22 where the nylon is a copolyamide of nylon 66 and nylon 6 (87–89/11–13% by weight), the phthalate wetting agents, diundecyl phthalate and dioctyl phthalate result in products with comparable mechanical and flame retarding properties.

Examples 20 and 23 demonstrate as in Examples 17 and 18 that when the phthalate ester wetting agent is present at a concentration of 1.5% the ethylene glycol concentration must be kept below 0.25% in order to avoid an adverse effect on the flammability of the resulting product.

Example 24 demonstrates that mixtures of the two phthalate ester wetting agents, diundecyl phthalate and dioctyl phthalate, are detrimental to the flammability of the resulting composite.

In Examples 16 and 26, the incorporation of ethylene glycol into the process for forming melamine cyanurate in a molten nylon 6 base resin produces an exceptional increase in the ductility of the resulting product while maintaining good flame retarding qualities.

EXAMPLES 27 TO 37

In Examples 27 through 37 various glycols are evaluated in the inventive process. C-0, C-1 and C-2 are Control Samples prepared according to the inventive process but without the benefit of the addition of a glycol. The results are tabulated in Table IV.

TABLE IV

| | % BY WEIGHT | | | | | | |
|---|---|---|---|---|---|---|---|
| | SUMMARY OF EXAMPLES 27 TO 30 | | | | | | |
| Polyamide-type | C-0 N66/6-1 | #27 N66/6-1 | C-1 N6 | #28 N6 | #29 N66/6-1 | #30 N6 | C-2 N66/6-2 |
| Polyamide | 89 | 89 | 89 | 89 | 89 | 89 | 89 |
| DUP | 1.3 | 1.3 | 0 | 0 | 1.3 | 0 | 1.3 |
| DOP | 0 | 0 | 1.3 | 1.3 | 0 | 1.3 | 0 |
| $H_2O$ | 1.5 | 1.0 | 1.5 | 1.0 | 1.0 | 1.0 | 1.5 |
| EG | | | | | | | |
| Octanediol | | 0.25 | | 0.40 | | | |
| Hydroquinone | | | | | 0.25 | 0.25 | |
| Propylene Glycol | | | | | | | |

TABLE IV-continued

| | % BY WEIGHT | | | | | | |
|---|---|---|---|---|---|---|---|
| Polyethylene Glycol | | | | | | | |
| Mel | 4.8 | 4.8 | 4.8 | 4.8 | 4.8 | 4.8 | 4.8 |
| CyA | 4.7 | 4.7 | 4.7 | 4.7 | 4.7 | 4.7 | 4.7 |
| Izod 0.32 cm. (J/m) | 36.3 | 39.0 | 48.1 | 42.7 | 39.0 | 42.7 | 42.7 |
| Tens. St. Y (MPa) | 79.5 | 77.1 | 73.7 | 74.3 | 78.3 | 75.4 | 77.8 |
| Tens. St. F (MPa) | 63.0 | 62.5 | 56.9 | 60.7 | 60.7 | 63.2 | 59.0 |
| Tens. Elong. F (%) | 24 | 34 | 91 | 171 | 25 | 208 | 21 |
| UL-94 Rating 0.32 cm. | V-0 | V-0 | V-0 | V-2 | V-0 | V-0 | V-0 |
| IGN. COTTON | NT | NT | 0 OF 5 | 4 OF 5 | NT | 1 OF 10 | NT |
| UL-94 RATING 0.16 cm. | V-0 | V-0 | V-0 | V-2 | V-2/V-0 | V-2 | V-2/V-0 |
| IGN. COTTON | NT | NT | 0 OF 5 | 4 OF 5 | NT | 5 OF 5 | NT |

| | SUMMARY OF EXAMPLES 31 TO 37 | | | | | | |
|---|---|---|---|---|---|---|---|
| Polyamide-type | #31 N66/6-2 | #32 N66/6-2 | #33 N66/6-2 | #34 N66/6-2 | #35 N66/6-2 | #36 N6 | #37 N66/6-2 |
| Polyamide | 89 | 89 | 89 | 89 | 89 | 89 | 89 |
| DUP | 1.3 | 1.5 | 1.5 | 1.5 | 1.3 | 0 | 1.0 |
| DOP | 0 | 0 | 0 | 0 | 0 | 1.3 | 0 |
| H$_2$O | 1.0 | 1.0 | 1.0 | 0.50 | 1.0 | 1.0 | 1.0 |
| EG | | 0.10 | | | | | |
| Octanediol | | | | | | | |
| Hydroquinone | 0.25 | | | | | | |
| Propylene Glycol | | | 0.10 | 0.20 | 0.25 | 0.25 | |
| Polyethylene Glycol | | | | | | | 0.50 |
| Mel | 4.8 | 4.8 | 4.8 | 4.8 | 4.8 | 4.8 | 4.8 |
| CyA | 4.7 | 4.7 | 4.7 | 4.7 | 4.7 | 4.7 | 4.7 |
| Izod 0.32 cm. (J/m) | 37.9 | 48.1 | 41.6 | 39.0 | 41.1 | 43.8 | 37.9 |
| Tens. St. Y (MPa) | 78.2 | 73.8 | 74.5 | 74.3 | 78.0 | 74.7 | 72.4 |
| Tens. St. F (MPa) | 61.4 | 58.6 | 58.3 | 58.6 | 62.3 | 57.8 | 59.3 |
| Tens. Elong. F (%) | 26 | 50 | 31.5 | 32 | 30 | 69 | 44.5 |
| UL-94 Rating 0.32 cm. | V-0 | V-0 | V-0 | V-0 | V-0 | V-2 | V-0 |
| IGN. COTTON | NT | NT | NT | NT | NT | 4 OF 5 | NT |
| UL-94 RATING 0.16 cm. | V-0 | V-2/V-0 | V-0 | V-0 | V-0 | V-2 | V-0 |
| IGN. COTTON | NT | NT | NT | NT | NT | 4 OF 5 | NT |

N66/6-1 = a copolyamide of nylon 66 (94 weight %) and nylon 6 (6 weight %).
N66/6-2 = a copolyamide of nylon 66 (87-89 weight %) and nylon 6 (11-13 weight %).
NT = Not Tested.

In Example 27, the use of octanediol in the inventive process results in a polyamide molding resin with improved ductility as compared to Control Sample C-0 and good flame retarding properties.

Example 28 demonstrates that although the addition of 0.40% octanediol to the inventive process favorably affects the ductility of the resulting resin as compared to Control Sample C-1, that glycol concentration adversely affects the flame retardancy of the resulting resin.

In Examples 29, 30 and 31, hydroquinone was evaluated in the inventive process at a concentration of 0.25% by weight in three different polyamide resins. The resulting resins generated inconsistent results with no sample exhibiting both improved ductility and good flame properties.

Example 32, in addition to its comparative function, demonstrates the lower limit at which ethylene glycol should be present in the inventive process. At a 0.10% concentration level, ethylene glycol is only partially effective in that its presence favorably affects the ductility but not the flame retarding properties of the resulting resin when tested at a thickness of 0.16 cm.

In Examples 33, 34, 35 and 36, propylene glycol is evaluated at 0.10%, 0.20% and 0.25% concentration levels with a copolyamide of nylon 66 (87-89 weight %) and nylon 6 (11∝13 weight %) and with a homopolyamide of nylon 6. Favorable results are obtained at the concentration levels of 0.10% and 0.20% but the concentration level of 0.25% resulted in resins that generated inconsistent flame retarding and mechanical properties.

Example 37 demonstrates the effectiveness of 0.50% polyethylene glycol when used in the inventive process. The resulting polyamide molding resin exhibits improved mechanical properties and good flame retardancy as compared to Control Sample C-2.

Having thus described the invention what is claimed is:

1. In a process for preparing a flame retardant polyamide molding resin containing melamine cyanurate as a flame retarding agent which includes melt-blending melamine or derivatives thereof, cyanuric acid and a polyamide in the presence of water, the improvement comprising the addition of a glycol and a phthalate ester.

2. The improved process of claim 1 wherein the polyamide is present in an amount from about 79.5% to about 92.9% by weight, melamine or derivatives thereof is present in an amount from about 3.0% to about 7.5% by weight, cyanuric acid is present in an amount from about 3.0% to about 7.5% by weight, the glycol is present in an amount from about 0.10% to about 0.50% by weight, the phthalate ester is present in an amount from about 0.5% to about 3.0% by weight and water is present in an amount from about 0.5% to about 2.0% by weight based on the total weight of the polyamide, melamine or derivatives thereof, cyanuric acid, glycol, phthalate ester and water.

3. The improved process of claims 1 or 2 wherein the glycol is selected from the group consisting of glycols that are compatible with water and which do not contribute significantly to the fuel value of the resulting polyamide molding resin.

4. The improved process of claims 1 or 2 wherein the glycol is selected from the group including ethylene glycol, propylene glycol, polyethylene glycol and octanediol.

5. The improved process of claim 4 wherein the glycol is present in an amount from about 0.10% to about 0.20% by weight.

6. The improved process of claims 1 or 2 wherein the glycol is ethylene glycol.

7. The improved process of claims 1 or 2 wherein the phthalate ester is selected from the group consisting of diundecyl phthalate and dioctyl phthalate.

8. The improved process of claims 1 or 2 wherein the phthalate ester is diundecyl phthalate.

9. The improved process of claim 8 wherein diundecyl phthalate is present in an amount from about 0.5% to about 2.0% by weight.

10. The improved process of claims 1 or 2 wherein the phthalate ester is dioctyl phthalate.

11. The improved process of claim 10 wherein dioctyl phthalate is present in an amount from about 1.0% to about 2.5% by weight.

12. The improved process of claims 1 or 2 wherein the polyamide is nylon 66.

13. The improved process of claims 1 or 2 wherein the polyamide is nylon 66/6 copolyamide.

14. The improved process of claims 1 or 2 wherein the polyamide is nylon 6.

15. A flame retardant polyamide molding resin prepared by a process wherein a polyamide, melamine or derivatives thereof, cyanuric acid, a glycol and a phthalate ester are melt-blended in the presence of water.

16. A flame retardant polyamide molding resin preparable by a process wherein a polyamide, melamine or derivatives thereof, cyanuric acid, a glycol and a phthalate ester are melt-blended in the presence of water.

17. A flame retardant polyamide molding resin comprising a polyamide, about 6.0% to about 15.0% by weight of melamine cyanurate, formed in situ, in the presence of water, from about 0.5% to about 3.0% by weight of diundecyl phthalate or dioctyl phthalate and a minor amount of a glycol.

18. The flame retardant polyamide molding resin of claim 17 wherein the polyamide is selected from the group including nylon 66, nylon 66/6 copolyamide and nylon 6.

19. A flame retardant polyamide molding resin comprising from about 79.5% to about 92.9% by weight of nylon 6, from about 6.0% to about 15.0% by weight of melamine cyanurate, formed in situ, in the presence of water, from about 0.5% to about 3.0% by weight of diundecyl phthalate or dioctyl phthalate and a minor amount of ethylene glycol.

* * * * *

UNITED STATES PATENT AND TRADEMARK OFFICE
CERTIFICATE OF CORRECTION

PATENT NO.   : 5,037,869

DATED        : AUGUST 6, 1991

INVENTOR(S)  : WILLIAM E. SPRENKLE, JR.

It is certified that error appears in the above-identified patent and that said Letters Patent is hereby corrected as shown below:

Column 1, line 32 of the Patent, change "decoxposition" to --decomposition--.

Column 4, line 67 of the Patent, change "t" to --at--.

Column 9, line 54 of the Patent, after "amount of" insert --water required to effect the consistent formation of--.

Column 11, line 60, change "(11∝13 weight %)" to --(11-13 weight %)--.

Signed and Sealed this

Twentieth Day of October, 1992

Attest:

DOUGLAS B. COMER

*Attesting Officer*  *Acting Commissioner of Patents and Trademarks*